May 10, 1932. J. VERDERBER 1,858,066
LOCKING MECHANISM
Original Filed Oct. 11, 1928 2 Sheets-Sheet 2
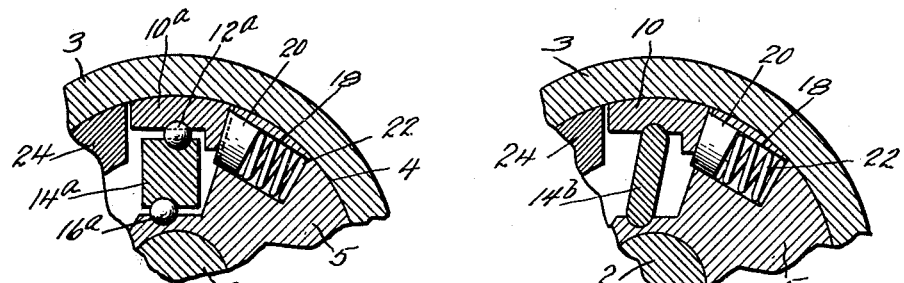
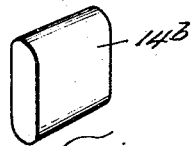
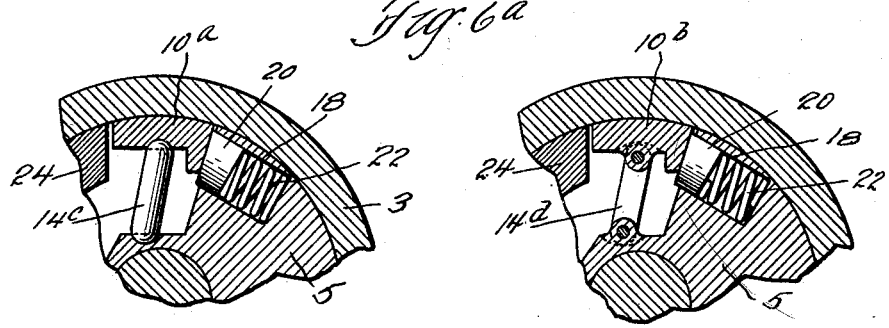
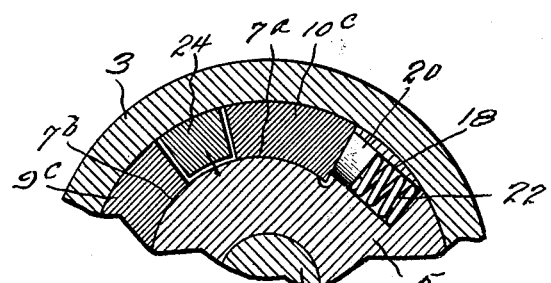
Inventor
Joseph Verderber
By Hull, Brock & West
Attorney Patented May 10, 1932

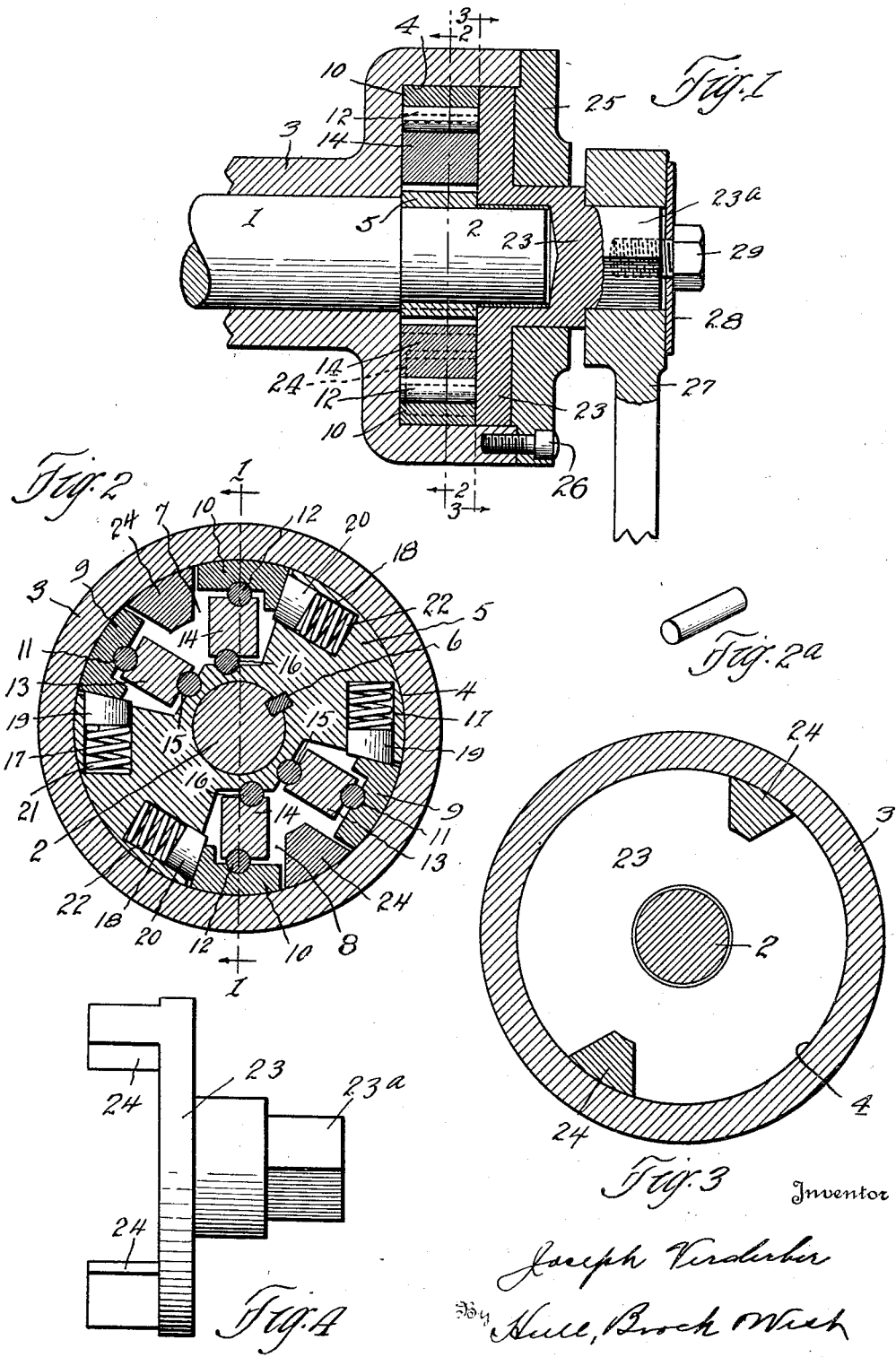

1,858,066

UNITED STATES PATENT OFFICE

JOSEPH VERDERBER, OF CLEVELAND, OHIO

LOCKING MECHANISM

Application filed October 11, 1928, Serial No. 311,764. Renewed October 26, 1931.

This invention relates generally to a locking mechanism for preventing rotary movement between two relatively movable members and which is of general application.

The main object of the invention is to provide a simple and efficient locking mechanism by means of which a shaft or other member may be locked against rotation in either direction but which will permit rotation of the shaft by means of an operating member.

A further object of the invention is to provide a locking mechanism of the character described which comprises few parts which are readily assembled or disassembled and which is well adapted for production at comparatively low cost.

Further and more limited objects of the invention will appear as the description proceeds and by reference to the accompanying drawings in which Fig. 1 is a fragmentary sectional view on the line 1—1 of Fig. 2 and illustrating the preferred embodiment of my invention; Fig. 2 is a vertical sectional view on the line 2—2 of Fig. 1; Fig. 2ª is a perspective view of one of the rollers; Fig. 3 is a vertical sectional view on the line 3—3 of Fig. 1; Fig. 4 is a detail view in side elevation of the operating member; Fig. 5 is a fragmentary sectional view showing a modified form of the locking mechanism; Fig. 6 is a fragmentary sectional view illustrating a second modification of the locking mechanism; Fig. 6ª a detail perspective view of one of the locking elements of the modification shown in Fig. 6; Fig. 7 is a fragmentary sectional view disclosing a third modification of the locking mechanism; Fig. 8 is a fragmentary sectional view disclosing a fourth form of the locking mechanism; and Fig. 9 is a fragmentary sectional view disclosing a fifth form of the locking mechanism.

Referring now to the drawings the reference character 1 designates a shaft having a reduced end 2. Surrounding the shaft 1 is a sleeve or casing 3 in which the shaft has a working fit and which terminates at its outer end in an enlarged portion defining an annular recess 4. Fitting within the recess 4 is an annular member or block 5 which fits over the reduced end 2 of the shaft and is non-rotatably secured thereto by means of a key 6. The annular member 5 is provided with a pair of oppositely disposed recesses or notches 7 and 8 which are of the shape shown most clearly in Fig. 2. Arranged within each of the recesses 7 and 8 are a pair of blocks or pawls 9 and 10, which are shaped as shown most clearly in Fig. 2. Also arranged within each of the recesses 7 and 8 are rollers 11 and 12 which engage respectively the recesses provided in the blocks 9 and 10. Also disposed within each of the recesses 7 and 8 are rectangular blocks or strut members 13 and 14 which are disposed at an angle to each other and are so mounted as to have a pivotal movement with respect to the blocks or pawls 9 and 10. Rollers 15 and 16 form a bearing for the inner ends of the blocks 13 and 14 and engage in recesses in the block 5, as shown most clearly in Fig. 2. Also arranged within the annular block 5 are a plurality of annular recesses 17 and 18 which intersect the recesses 7 and 8 at an angle thereto. Slidably mounted within the recesses 17 and 18 are cup shaped plungers or thimbles 19 and 20 respectively, which are normally urged outwardly by coil springs 21 and 22. The thimbles or plungers bear against the opposite ends of the pawls 9 and 10 and tend to pivot the pawls about the rollers, the purpose of which will hereinafter appear.

Fitting over the reduced end 2 of the shaft 1 is an annular member 23 which has a working fit in the annular recess 4 and is rotatably mounted on the reduced end 2 of the shaft 1. The member 23 has a pair of projections 24 thereon which project into the recesses 7 and 8 respectively, as shown most clearly in Fig. 2. A closure cap or cover 25 closes the outer end of the annular recess 4 and is held thereon by screws 26. The closure 25 has a centrally disposed opening therein through which the end of the member 23 projects. The outer end 23ª of the member 23 is preferably hexagonal in shape and receives thereover an operating handle or lever 27 which is non-rotatably connected with the member 23 by a plate 28 and screw 29. The projections 24 are shaped in section as shown most clearly in Fig. 2 and fit within the recesses 7 and 8 so as to engage the ends of the pawls 9 and 10 respectively when the operating lever is rotated in either direction.

From an inspection of Fig. 2 it will be seen that the rollers 11 and 15 and 12 and 16 are offset with respect to each other, that is, they are disposed along different radii. It will therefore be seen that should the shaft 1 be turned in either direction independent of the operating handle, the pawls 10 and 11 and blocks 13 and 14 will produce a toggle action and prevent rotation of the shaft with respect to the sleeve 3. However, should the operating lever 27 be turned in either direction, the projections 24 will engage the pawls and the aforementioned toggle action will not be obtained and the shaft may be freely rotated with respect to the sleeve in either direction. The springs 17 and 18 normally urge the thimbles 19 and 20 against the pawls 9 and 10 and maintain the same in position to produce the toggle action hereinbefore referred to.

It will therefore be seen that the shaft may be rotated in either direction by means of the operating lever 27 but that the rotation of the shaft independent of the operating lever will be prevented.

In Fig. 5 there is disclosed a modified form of locking mechanism which is identical with the form of the invention shown in Figs. 1 to 4 inclusive except that I make use of blocks or pawls $10^a$ and $14^a$ which are pivotally mounted within the recess by means of spherical balls $12^a$ and $16^a$.

In Fig. 6 there is disclosed a second modification in which the block or pawl 10 is pivotally supported within the recess by means of an angularly disposed plate or block $14^b$, the ends of which are rounded and fit within recesses provided in the pawl 10 and block 5. The block or plate $14^b$ is shown in detail in Fig. $6^a$.

In Fig. 7 there is disclosed a third modification of locking mechanism similar to that shown in Fig. 5 except that the block or pawl $10^a$ is pivotally supported within the recess by means of an angularly disposed pin $14^c$, the opposite ends of which are rounded and fit in recesses provided in the pawl $10^a$ and block 5.

In Fig. 8 there is disclosed a fourth modification in which the pawl or block $10^b$ is pivotally supported within the recess by means of an angularly disposed link $14^d$ which is pivotally connected to the pawl $10^b$ at one end and to the block 5 at its opposite end.

It is of course understood that the locking mechanisms shown in Figs. 5 to 9 inclusive are arranged in pairs, two in each recess so as to prevent rotation of the shaft in either direction except by means of the operating member.

In Fig. 9 there is disclosed a fifth modification of locking mechanism in which the block 5 is provided with a recess having a pair of cam surfaces $7^a$ and $7^b$. Arranged within the recess are a pair of blocks or pawls $9^c$ and $10^c$ which are urged toward each other by means of the coil spring 18 and thimble 20. From an inspection of Fig. 9, it will be seen that should an attempt be made to rotate the shaft 2 clockwise, as shown in Fig. 2, with respect to the sleeve 3, the pawl $10^c$ will bear against the inner periphery of the recess 4 and produce a wedging action and thus prevent such rotation. It will also be seen that the shaft may be freely turned in either direction by means of the operating lever 27 because of the fact that the projection 24 on the operating member 23 will engage either one or the other of the pawls and move it down the cam surface and out of engagement with the peripheral wall of the recess.

It will now be clear that I have provided a very simple and effective locking mechanism which will accomplish the objects of the invention hereinbefore stated. Various changes may be made in the details of construction as well as in the shape and arrangement of the several parts without departing from the spirit of my invention. The accompanying drawings are merely illustrative and should not be considered in a limiting sense and my invention is to be limited only in accordance with the scope of the appended claims.

Having thus described my invention, what I claim is:—

1. In a locking member of the character described, the combination of a shaft, a sleeve surrounding said shaft and non-rotatable with respect thereto, a generally circular disk fitting within said sleeve and having a plurality of peripheral notches therein extending radially inwardly, bores in corresponding faces of said notches, thimbles in said bores, spring members urging said thimbles outwardly, an operating member having projections thereon extending into said notches respectively, a plurality of pairs of friction blocks arranged in each of said notches and adapted to be engaged by said projections respectively, said friction blocks and the inner ends of said notches each being provided with depressions for receiving bearing means, means cooperating with said depressions to provide with said disk and said friction blocks locking mechanism for locking said sleeve and said disk against relative rotation in either direction said friction blocks each being provided at one end with a lateral extension for cooperation with said thimble, said projections and said friction blocks having such dimensions circumferentially of said sleeve as to nearly but not completely fill said notches, said projections on said operating member serving to render said locking mechanism ineffective as a means for moving said shaft in either direction.

2. A locking mechanism including a casing having an annular recess therein, an annular member rotatable in said recess and having a notch therein, a pair of pawls in said notch each against the circular wall of said annular recess, a strut member between each one of said pawls and the bottom of said notch, the longitudinal axes of said strut members being oppositely angular with a radial axis of the mechanism passing between the strut members, a spring for each of said pawls mounted in said annular member and each normally tending to move said pawls along said circular wall and toward each other to decrease the angularity between the axes of said strut members and said radial axis, and a driving member rotatable in said annular recess and having an extension reaching into said notch between said pawls to engage and to circularly move the same against the springs thereof to increase the angularity between the axes of said strut members and said radial axis and to rotate said annular member upon rotation of said driving member.

3. A locking mechanism including a casing having an annular recess therein, an annular member rotatable in said recess and having a notch therein, a pair of pawls in said notch each against the circular wall of said annular recess, a strut member between each of said pawls and the bottom of said notch, the longitudinal axes of said strut members being angular, a spring for each of said pawls mounted in said annular member and each normally tending to decrease the angularity between the axes of said strut members, and a driving member rotatable in said annular recess and having a projection reaching into said notch between said pawls to engage and circularly move the same against the springs thereof to increase the angularity between the axes of said strut members and rotate said annular member upon rotation of said driving member.

4. A locking mechanism including a casing having an annular recess therein, an annular member rotatable in said recess and having a notch therein, a pair of pawls in said notch each against the circular wall of said annular recess, a strut member between each of said pawls and the bottom of said notch, the longitudinal axes of said strut members being angular, and a spring for each of said pawls mounted in said annular member and each normally tending to decrease the angularity between the axes of said strut members to lock said annular member to said casing.

5. A locking mechanism including a casing having an annular recess therein, an annular member rotatable in said recess and having a notch therein, a pair of pawls in said notch each against the circular wall of said annular recess, a strut member between each of said pawls and the bottom of said notch, the longitudinal axes of said strut members being angular, and a spring for each of said pawls mounted in said annular member and each normally tending to decrease the angularity between the axes of said strut members to lock said annular member to said casing and to further decrease the angularity and increase the locking upon a tendency of said annular member to rotate.

6. A locking mechanism including a casing having an annular recess therein, an annular member rotatable in said recess and having a notch therein, a pair of pawls in said notch each against the circular wall of said annular recess, a strut member between each of said pawls and the bottom of said notch, the longitudinal axes of said strut members being angular, a spring for each of said pawls mounted in said annular member and each normally tending to decrease the angularity between the axes of said strut members to lock said annular member against rotation in said casing and to further decrease the angularity and increase the locking upon a tendency of said annular member to rotate, and a driving member rotatable in said annular recess and having a projection reaching into said notch between said pawls to engage and circularly move the same against the springs thereof to increase the angularity between the axes of said strut members and rotate said annular member upon rotation of said driving member.

7. A locking mechanism including a casing, an annular member rotatable in said casing, a pair of pawls between said casing and said annular member, a strut member for each of said pawls between said rotatable member and the corresponding one of said pawls, the axes of said strut members being angular, springs normally tending to move said pawls toward each other and thereby tend to decrease the angularity of said axes to lock said annular member against rotation in either direction and to further decrease the angularity and the locking upon a tendency of said annular member to rotate in either direction.

In testimony whereof, I hereunto affix my signature.

JOS. VERDERBER.